United States Patent Office 2,833,786
Patented May 6, 1958

2,833,786

PROCESS FOR PRODUCTION OF GLUTAMIC ACID

Joseph L. Purvis, Cincinnati, Ohio, assignor to International Minerals & Chemical Corporation, a corporation of New York No Drawing. Application February 28, 1956
Serial No. 568,199

16 Claims. (Cl. 260—343.6)

This invention is concerned with the preparation of alpha-hydroxyglutaric acid, the lactone of this acid, and alpha-haloglutaric acid, and more particularly with the preparation of these compounds from 3-halocyclopentene and the conversion of these compounds into glutamic acid.

Alpha-hydroxyglutaric acid, the lactone of this acid, and alpha-chloroglutaric acid are known compounds. Dehydrogenation of alpha-hydroxyglutaric acid produces alpha-ketoglutaric acid which can be converted to glutamic acid. The production of glutamic acid by this method, however, is commercially unfeasible due to the cost of raw materials and reagents and the cumbersome procedures involved.

L-glutamic acid in the form of its monosodium salt is widely as a seasoning material. Substantially all glutamic acid utilized commercially is recovered from naturally occurring materials such as proteins and sugar beet residues such as concentrated Steffen's filtrate. Heretofore, no commercially feasible process for synthesizing glutamic acid has been available.

One object of this invention is to provide a novel process for producing glutaric acid compounds from 3-halocyclopentene.

Another object of this invention is to provide a process for producing alpha-hydroxyglutaric acid, alpha-hydroxyglutaric acid lactone or alpha-haloglutaric acid or a mixture of two or more of these compounds from 3-halocyclopentene.

Another object of this invention is to provide a process for producing alkyl-substituted glutaric acid compounds from the corresponding alkyl-substituted 3-halocyclopentenes.

Another object of this invention is to provide a process for synthesizing DL-glutamic acid from 3-halocyclopentene.

It is a further object of this invention to provide a process for producing L-glutamic acid from either dicyclopentadiene or cyclopentadiene.

In accordance with this invention, a 3-halocyclopentene such as 3-chlorocyclopentene or 3-bromocyclopentene is oxidized to either alpha-hydroxyglutaric acid, alpha-hydroxyglutaric acid lactone, alpha-haloglutaric acid or a mixture of two or more of these compounds. Alpha-hydroxyglutaric acid or the lactone of this acid, or alpha-haloglutaric acid, or a mixture of two or more of them may then be ammoniated to produce glutamic acid or a glutamic acid precursor compound. Hydrolysis of the glutamic acid precursor compound under either conventional acid or alkaline conditions results in the formation of DL-glutamic acid which may be resolved to produce L-glutamic acid.

The term "a halocyclopentene" as used herein, refers to unsubstituted halocyclopentenes such as chlorocyclopentene, bromocyclopentene, iodocyclopentene or fluorocyclopentene and also to substituted halocyclopentenes such as alkyl-substituted halocyclopentenes, for example, halocyclopentenes in which one or more alkyl or other substituents is attached to a carbon atom in the cyclopentene ring. Representative alkyl substituent groups include lower alkyl groups, that is, alkyl groups containing less than about eight carbon atoms, for example, methyl, ethyl, propyl, isopropyl, butyl, etc. The term "halocyclopentene" refers to unsubstituted halocyclopentenes, namely, chlorocyclopentene, bromocyclopentene, iodocyclopentene or fluorocyclopentene.

Reaction of a halocyclopentene with ozone and decomposition of the reaction product in accordance with this invention results in a glutaric acid compound corresponding to the starting material in the number of carbon atoms in the molecule. For example, an alkylhalocyclopentene will be converted to the corresponding alkyl-substituted glutaric acid—either alkylhydroxy glutaric acid or its lactone or alkylhaloglutaric acid or a mixture of two or mores of these glutaric acid compounds depending upon the reaction conditions used.

According to one embodiment of this invention, 3-halocyclopentene is produced by first heating dicyclopentadiene to a temperature above 170° C. Dicyclopentadiene depolymerizes under these conditions to form cyclopentadiene. Treatment of cyclopentadiene with gaseous hydrogen halide, preferably hydrogen chloride, at a temperaturee below about 0° C. and preferably between about —50° C. and —70° C., produces 3-halocyclopentene which may be separated from the reaction product mixture by distillation at subatmospheric pressures.

Oxidation of 3-halocyclopentene to alpha-hydroxyglutaric acid lactone is preferably effected by dissolving the 3-halocyclopentene in a suitable solvent and passing an ozone-containing gas through the solution. Any solvent for 3-halocyclopentene which does not react during the ozone treatment may be utilized. Halogenated hydrocarbons such as methylene chloride, chloroform, carbon tetrachloride and the like may be employed as solvents and naphthenes, alcohols, lower fatty acids, and the like may also be used. Illustrative solvents include cyclohexane; alkylcyclohexanes such as methylcyclohexane, ethylcyclohexane and the like; cyclopentane and alkylcyclopentanes; alcohols such as methyl alcohol, ethyl alcohol, propyl alcohol, butyl alcohol and other lower alcohols; acetic acid, propionic acid and esters of lower fatty acids and lower alcohols such as ethyl acetate, propyl acetate, ethyl propionate and the like. Any solvent for the 3-halocyclopentene which does not alter the ozonization reaction is useful in the process.

Oxidation of a 3-halocyclopentene is preferably carried out by passing a dry mixture of ozone and oxygen or air through a solution of the 3-halocyclopentene. Mixtures of ozone with air or other gases unaffected by the ozonization reaction such as inert gases, for example, nitrogen, may also be employed. The concentration of ozone in the gaseous mixture is not critical and pure ozone may be utilized if desired. High concentrations of ozone may result in a waste of this reagent if the equipment or the rate of flow of ozone-containing gas does not permit adequate contact between the ozone and the 3-halocyclopentene. Conveniently an ozone-containing gas with an ozone concentration between about 2% and about 15% by weight is employed and preferably an ozone-air mixture or an ozone-oxygen mixture having these concentrations is employed. Low concentrations of ozone merely result in extended reaction times.

The temperature during ozonization also may be varied widely within certain limits and generally temperatures at or below about room temperature may be employed. Temperatures outside of these limits may also be used in certain circumstances. Preferably, the temperature during ozonization is maintained between about —20° C. and about —40° C.

Rate of addition of ozone to the reaction mixture is not critical; any convenient and reasonable rate may be utilized. Naturally the faster the rate of passage of ozone through the mixture, the more likely that a certain amount of ozone will be wasted due to incomplete reaction, while slow rates of addition of ozone will extend reaction times. Passage of ozone through the mixture is continued until ozone in substantial amounts appears in the exit gases, thus indicating that the 3-halocyclopentene is substantially completely reacted. The ozone reaction product will be referred to herein as an "ozonide" for convenience, but there is no intention to limit the invention by use of this term since it is not known whether the reaction product of 3-halocyclopentene and ozone is a true ozonide.

Following completion of the ozonization reaction, the reaction product mixture is oxidized to decompose the ozonide. Oxidation can be effected by adding the ozonide solution to water and passing air, oxygen or ozone or any combination of them through the solution until the solution is clear. Treatment of the ozonide with an oxidizing agent such as cupric oxide or the like will also decompose the ozonide. Alternatively, the ozonide solution may be acidified with a lower fatty acid such as, for example, formic acid, acetic acid or the like and then admixed with water and hydrogen peroxide. Refluxing the ozonide with one of these oxidizing agents for about two hours or more readily converts the ozonide of the 3-halocyclopentene to alpha-hydroxyglutaric acid lactone or alpha-haloglutaric acid or a mixture of the two compounds, depending upon the decomposition conditions. Decomposition of the ozonide with hydrogen peroxide is catalyzed somewhat by the presence of sulfuric acid. The relative quantities of water, hydrogen peroxide and sulfuric acid can be varied widely and sulfuric acid can be omitted if desired. Complete decomposition of the ozonide is indicated by a clear solution.

An aqueous solution of alpha-hydroxyglutaric acid, the lactone of this acid, and alpha-haloglutaric acid (preferably the chloro or bromo derivative but permissibly the fluoro compound) produced by the decomposition reactions as outlined above, upon standing at room temperature, spontaneously converts to substantially alpha-hydroxyglutaric acid lactone alone. By varying the conditions for oxidizing 3-halocyclopentene or decomposing the corresponding ozonide, either alpha-hydroxyglutaric acid, alpha-hydroxyglutaric acid lactone or alpha-haloglutaric acid may be produced as substantially the sole decomposition (oxidation) product. Decomposing the ozonide of 3-halocyclopentene under acidic conditions, as with hydrogen peroxide, results in formation of a mixture of alpha-haloglutaric acid and alpha-hydroxyglutaric acid lactone with some alpha-hydroxyglutaric acid being present, but decomposing the ozonide under basic conditions with, for example, cupric oxide, produces mostly alpha-hydroxyglutaric acid with a smaller proportion of the corresponding lactone. Since any of these compounds or their mixture may be ammoniated to glutamic acid or a glutamic acid precursor compound and this mixture hydrolyzed to glutamic acid, there is no particular need for producing any one of them as the sole decomposition product where glutamic acid is desired as the ultimate end product. Also in the case where alpha-hydroxyglutaric acid lactone is to be the end product, there is no need to use special conditions to eliminate formation of alpha-haloglutaric acid simultaneously during the decomposition because an aqueous mixture of alpha-hydroxyglutaric acid, the lactone of this acid, and alpha-haloglutaric acid, upon standing at room temperature, spontaneously changes to alpha-hydroxyglutaric acid lactone. After substantially complete conversion of the mixture to lactone, the latter may be recovered by simply evaporating the solution, leaving the lactone as a residue.

Preparation of glutamic acid from alpha-hydroxyglutaric acid or its lactone or alpha-haloglutaric acid or a mixture thereof, may be carried out by treatment with ammonia at an elevated temperature. Best yields are obtained at temperatures above about 250° C. but temperatures as low as about 200° C. may be utilized if lower yields are acceptable. Preferably the ammonia treatment is carried out for between about ½ and about 30 hours at between about 250° C. and about 350° C., but shorter times and/or higher temperatures may be used.

Prior to ammonia treatment, any sulfuric acid in the solution containing lactone or alpha-chloroglutaric acid is preferably either neutralized or removed. If sulfuric acid is utilized in the oxidation, the sulfate ions in the reaction product mixture may be precipitated as barium sulfate by treatment with BaO or hydroxide, for example, and removed by filtration. Other inorganic ions may be similarly separated as their insoluble salts.

Ammoniation may be carried out using either aqueous or anhydrous ammonia. Ammonium carbonate may be employed as a catalyst where aqueous ammonia is employed, but excellent results are also obtained in the absence of such a catalyst. Prior to ammoniation it is desirable to remove any acids present in order to minimize the amount of ammonia required. Lower fatty acids may be removed by evaporation.

The quantity of ammonia either in the aqueous or anhydrous form is not critical and may be varied widely. It is only necessary that sufficient ammonia be utilized to completely react with alpha-hydroxyglutaric acid lactone or alpha-haloglutaric acid or a mixture thereof as the case may be.

The product of the ammoniation reaction is glutamic acid or a glutamic acid precursor compound which is thought to be the ammonium salt of 2-ozo-5-pyrrolidinecarboxylic acid. The precursor is readily converted to glutamic acid by hydrolysis under the same conditions which convert 2-oxo-5-pyrrolidinecarboxylic acid to glutamic acid. Glutamic acid is recovered from the hydrolyzate by crystallization at its isoelectric point.

The following examples illustrate specific embodiments of this invention. All parts and percentages are by weight unless otherwise indicated.

*Example 1*

48.5 parts of a commercial dicyclopentadiene concentrate was depolymerized to cyclopentadiene by adding the same dropwise to a reaction vessel heated to a temperature of about 225° C. Cyclopentadiene (boiling point 37° C. to 45° C.) was collected in a vessel surrounded by Dry Ice. Cyclopentadiene was recovered in the amount of about 45.3 parts and converted to 3-chlorocyclopentene by treatment with 25 parts of gaseous hydrogen chloride in a Dry Ice-liquid bath at about −60° C. 3-chlorocyclopentene was distilled from the reaction product mixture at about 22° C. at a pressure of about 5 mm. of mercury and recovered in a yield amounting to 42.9 parts.

Ozonization of 3-chlorocyclopentene was effected by dissolving the compound in about 400 parts of methylene chloride which had been previously cooled to a temperature of −70° C. A dry mixture of oxygen and ozone containing about 3% ozone by weight was passed through the solution at −70° C. at the rate of 30 liters per hour for about 14 hours, at the end of which time ozone was first detected in the exit gases. Treatment with ozone was then discontinued and 150 parts of glacial acetic acid was added to the reaction product mixture. Methylene chloride was removed by distillation under subatmospheric pressure.

Destruction of the ozonide of 3-chlorocyclopentene was accomplished by adding the ozonide in acetic acid solution to a mixture of 300 parts water, 146 parts of 30% hydrogen peroxide and 10.5 parts concentrated sulfuric acid and refluxing the mixture for about two and one-half hours. The refluxed mixture was then cooled and treated with sufficient barium hydroxide to precipitate the sulfate ions in the solution and the barium sulfate precipitate was removed by filtration. The mother liquor was an aqueous-acetic acid solution of alpha-hydroxyglutaric acid lactone and alpha-chloroglutaric acid. Upon standing at room temperature the alpha-chloroglutaric acid was converted to alpha-hydroxyglutaric acid lactone and the latter compound was recovered as residue by evaporating the water and acetic acid from the solution. The yield of alpha-hydroxyglutaric acid lactone amounted to about 90+% based upon the 3-chlorocyclopentene used.

*Example II*

Alpha-hydroxyglutaric acid lactone, produced as in Example I, in the amount of 51.2 parts was dissolved in 450 parts of 28% aqueous ammonia and heated at 250° C. in an autoclave under autogenous pressure for about twelve hours. Aqueous ammonia was then evaporated from the reaction product mixture and the residue admixed with 208 parts of 20% hydrochloric acid and hydrolyzed for four hours. The hydrolyzate was evaporated to dryness and dissolved in 200 parts of $H_2O$ and treated with sodium hydroxide to adjust the pH to about 3.2 and glutamic acid was crystallized from the solution. The glutamic acid thus recovered was identified as DL-glutamic acid and obtained in an amount of about 36 parts. L-glutamic acid was produced from the DL-glutamic acid by resolution in accordance with conventional procedures.

*Example III*

3-chlorocyclopentene in the amount of 42.9 parts prepared as in Example I was converted to the ozonide by dissolving in 480 parts of carbon tetrachloride and passing a mixture of ozone and air containing about 3% ozone by weight through the solution at the rate of about 30 liters per hour until ozone appeared in the exit gases. Temperature of the solution during ozonization was maintained at +15° C.

Destruction of the ozonide of 3-chlorocyclopentene was accomplished by admixing the reaction solution containing the ozonide with water and refluxing the aqueous mixture for about 3 hours with the simultaneous introduction of oxygen at the rate of about 30 liters per hour. Evaporation of the reaction mixture to remove solvent therefrom left an oily material which was identified as a mixture containing alpha-hydroxyglutaric acid lactone and alpha-chloroglutaric acid. This oily material was dissolved in 450 parts of 28% aqueous ammonia and was heated at 250° C. in an autoclave under autogenous pressure for about twelve hours. Ammonia was then evaporated from the reaction product mixture and the residue was admixed with 208 parts of 20% hydrochloric acid and hydrolyzed for four hours. The hydrolyzate was evaporated to dryness and the residue dissolved in about 200 parts of water. Sodium hydroxide was added in sufficient amount to adjust the pH to about 3.2 and glutamic acid was crystallized from the solution. The glutamic acid thus recovered was identified as DL-glutamic acid and was obtained in a yield of about 7% based on the quantity of 3-chlorocyclopentene starting material employed. L-glutamic acid was produced from the DL-glutamic acid by resolution in accordance with conventional procedures.

Having now fully described the invention what is desired to be secured by Letters Patent is:

1. A process comprising oxidizing a 3-halocyclopentene with ozone and oxidizing the ozone reaction product to produce a glutaric acid compound selected from the group consisting of the corresponding alpha-hydroxyglutaric acid, alpha-hydroxyglutaric acid lactone, and alpha-haloglutaric acid.

2. The process of claim 1 in which the 3-halocyclopentene compound is 3-halocyclopentene.

3. The process of claim 2 in which the 3-halocyclopentene is 3-chlorocyclopentene.

4. The process of claim 3 in which the ozone reaction product is treated with hydrogen peroxide at an elevated temperature.

5. The process of claim 4 in which the treatment with hydrogen peroxide is carried out at reflux temperatures in the presence of sulfuric acid.

6. The process of claim 3 in which the ozone reaction product is oxidized at reflux temperature with oxygen.

7. A process comprising oxidizing 3-chlorocyclopentene with ozone by passing an ozone-containing gas through a solution of 3-chlorocyclopentene in an organic solvent at a temperature below room temperature and oxidizing the resulting oxonide to produce a mixture of alpha-hydroxyglutaric acid lactone and alpha-chloroglutaric acid.

8. The process of claim 7 in which said ozonide is oxidized with hydrogen peroxide in the presence of sulfuric acid.

9. A process comprising oxidizing a 3-halocyclopentene with ozone and oxidizing the ozone reaction product to produce a glutaric acid compound selected from the group consisting of the corresponding alpha-hydroxyglutaric acid, alpha-hydroxyglutaric acid lactone, and alpha-haloglutaric acid, treating the glutaric acid compound with ammonia at a temperature above about 200° C. until the reaction is substantially complete, hydrolysing the reaction product mixture and recovering a glutamic acid from the hydrolyzate.

10. The process of claim 9 in which the 3-halocyclopentene compound is 3-halocyclopentene.

11. The process of claim 10 in which the 3-halocyclopentene compound is 3-chlorocyclopentene.

12. The process of claim 11 in which the ozone reaction product is oxidized with hydrogen peroxide at an elevated temperature.

13. The process of claim 12 in which the oxidation with hydrogen peroxide is carried out at reflux temperatures in the presence of sulfuric acid.

14. A process comprising oxidizing 3-chlorocyclopentene with ozone by passing an ozone-containing gas through a solution of 3-chlorocyclopentene in an organic solvent at a temperature below room temperature and oxidizing the resulting ozonide with an oxidizing agent to produce a mixture of alpha-hydroxyglutaric acid lactone and alpha-chloroglutaric acid, treating said mixture with ammonia at a temperature above about 200° C. until the reaction is substantially complete, hydrolyzing the resulting reaction product mixture to produce glutamic acid and recovering glutamic acid from the hydrolyzate.

15. The process of claim 14 in which the ammonia is in the form of aqueous ammonia.

16. A process comprising oxidizing 3-chlorocyclopentene with ozone by passing an ozone-containing gas through a solution of 3-chlorocyclopentene in an organic solvent at a temperature below room temperature, oxidizing the resulting ozonide under acid conditions with hydrogen peroxide and water to produce a glutaric acid compound selected from the group consisting of alpha-hydroxyglutaric acid, alpha-hydroxyglutaric acid lactone, and alpha-chloroglutaric acid, treating said glutaric acid compound with ammonia at a temperature between about 250 and about 350° C. for a period of about one-half to about 30 hours, hydrolyzing the resulting reaction product mixture, and recovering glutamic acid from the hydrolyzate.

References Cited in the file of this patent

Moffett: "Organic Syntheses," 32, 41–4 (1953).

UNITED STATES PATENT OFFICE
CERTIFICATE OF CORRECTION

Patent No. 2,833,786                                                               May 6, 1958

Joseph L. Purvis

It is hereby certified that error appears in the printed specification of the above numbered patent requiring correction and that the said Letters Patent should read as corrected below.

Column 1, line 30, after the word "widely" insert -- used --; column 4, line 32, for "-ozo-" read -- -oxo- --; column 6, line 45, strike out "with an oxidizing agent"--.

Signed and sealed this 12th day of August 1958.

(SEAL)
Attest:

KARL H. AXLINE                                                  ROBERT C. WATSON
Attesting Officer                                              Commissioner of Patents